United States Patent
Troxel et al.

(10) Patent No.: US 9,161,290 B2
(45) Date of Patent: *Oct. 13, 2015

(54) VARIABLE TRANSLUCENCY NO-SIGHT ROUTING FOR AD-HOC NETWORKS

(75) Inventors: Gregory Donald Troxel, Stow, MA (US); Subramanian Ramanathan, Westford, MA (US)

(73) Assignees: VERIZON PATENT AND LICENSING INC., Basking Ridge, NJ (US); RAYTHEON BBN TECHNOLOGIES CORP., Cambridge, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/413,434

(22) Filed: Mar. 6, 2012

(65) Prior Publication Data

US 2012/0163230 A1 Jun. 28, 2012

Related U.S. Application Data

(63) Continuation of application No. 11/087,406, filed on Mar. 23, 2005, now Pat. No. 8,144,595.

(60) Provisional application No. 60/555,970, filed on Mar. 25, 2004.

(51) Int. Cl.
| | |
|---|---|
| *H04W 40/12* | (2009.01) |
| *H04L 12/851* | (2013.01) |
| *H04L 12/24* | (2006.01) |
| *H04L 12/701* | (2013.01) |
| *H04L 12/841* | (2013.01) |
| *H04L 12/721* | (2013.01) |
| *H04L 12/707* | (2013.01) |

(52) U.S. Cl.
CPC ............ *H04W 40/12* (2013.01); *H04L 41/0896* (2013.01); *H04L 45/00* (2013.01); *H04L 47/2441* (2013.01); *H04L 45/123* (2013.01); *H04L 45/24* (2013.01); *H04L 47/286* (2013.01)

(58) Field of Classification Search
CPC . H04L 45/12; H04L 41/0896; H04L 47/2441; H04L 47/286
See application file for complete search history.

(56) References Cited

U.S. PATENT DOCUMENTS

| | | |
|---|---|---|
| 5,325,362 A | 6/1994 | Aziz |
| 5,473,599 A | 12/1995 | Li et al. |
| 5,490,139 A | 2/1996 | Baker et al. |
| 5,862,345 A | 1/1999 | Okanoue et al. |
| 5,922,049 A | 7/1999 | Radia et al. |

(Continued)

OTHER PUBLICATIONS

Corson, S.; "Mobile Ad hoc Networking (MANET)", RFC 2501, Jan. 1999, pp. 1-9., Jan. 1, 1999.

(Continued)

*Primary Examiner* — Xavier Szewai Wong

(57) ABSTRACT

A system comprising a plurality of nodes forming a network and a link-state packet capable of being transmitted by a source node in the network to a destination node in the network over a communication link; wherein the source node subtracts a transmission cost associated with the communication link from a time-to-live value associated with the link-state packet prior to transmitting the link-state packet to the destination node. Each node in the network may be configured to use a routing protocol, such as a no-sight routing protocol, to assign the transmission cost to the communication link.

19 Claims, 5 Drawing Sheets

(56) References Cited

U.S. PATENT DOCUMENTS

| | | | |
|---|---|---|---|
| 6,034,946 A * | 3/2000 | Roginsky et al. | 370/238 |
| 6,047,988 A | 4/2000 | Aloe et al. | |
| 6,049,825 A | 4/2000 | Yamamoto | |
| 6,061,650 A | 5/2000 | Malkin et al. | |
| 6,178,455 B1 | 1/2001 | Schutte et al. | |
| 6,195,705 B1 | 2/2001 | Leung | |
| 6,324,161 B1 | 11/2001 | Kirch | |
| 6,331,983 B1 * | 12/2001 | Haggerty et al. | 370/400 |
| 6,347,078 B1 | 2/2002 | Narvaez-Guarnieri et al. | |
| 6,356,945 B1 | 3/2002 | Shaw et al. | |
| 6,385,174 B1 | 5/2002 | Li | |
| 6,407,988 B1 | 6/2002 | Agraharam | |
| 6,445,922 B1 | 9/2002 | Hiller et al. | |
| 6,496,505 B2 | 12/2002 | La Porta et al. | |
| 6,578,085 B1 | 6/2003 | Khalil et al. | |
| 6,591,306 B1 | 7/2003 | Redlich | |
| 6,597,663 B1 | 7/2003 | Rekhter | |
| 6,636,498 B1 | 10/2003 | Leung | |
| 6,654,359 B1 | 11/2003 | La Porta et al. | |
| 6,690,659 B1 | 2/2004 | Ahmead et al. | |
| 6,697,354 B1 | 2/2004 | Borella et al. | |
| 6,760,309 B1 | 7/2004 | Rochberger et al. | |
| 6,775,298 B1 | 8/2004 | Aggarwal | |
| 6,819,654 B2 | 11/2004 | Soloway | |
| 6,826,172 B1 | 11/2004 | Augart | |
| 6,845,084 B2 | 1/2005 | Rangnekar et al. | |
| 6,965,568 B1 * | 11/2005 | Larsen | 370/238 |
| 6,977,937 B1 | 12/2005 | Weinstein et al. | |
| 6,996,084 B2 | 2/2006 | Troxel | |
| 7,013,342 B2 | 3/2006 | Riddle | |
| 7,028,099 B2 | 4/2006 | Troxel | |
| 7,039,025 B1 | 5/2006 | Menon et al. | |
| 7,310,339 B1 | 12/2007 | Powers et al. | |
| 7,310,688 B1 * | 12/2007 | Chin | 709/252 |
| 7,397,785 B2 | 7/2008 | Wu et al. | |
| 7,580,360 B2 | 8/2009 | Bryant et al. | |
| 7,768,943 B1 | 8/2010 | Troxel et al. | |
| 8,547,851 B1 * | 10/2013 | Jacobson et al. | 370/238 |
| 2001/0021638 A1 | 9/2001 | Spratt et al. | |
| 2001/0036834 A1 | 11/2001 | Das et al. | |
| 2001/0044305 A1 | 11/2001 | Reddy et al. | |
| 2001/0046223 A1 | 11/2001 | El Malki et al. | |
| 2002/0015395 A1 | 2/2002 | Karagiannis | |
| 2002/0021689 A1 | 2/2002 | Robbins et al. | |
| 2002/0026527 A1 | 2/2002 | Das et al. | |
| 2002/0075866 A1 | 6/2002 | Troxel et al. | |
| 2002/0078238 A1 | 6/2002 | Troxel | |
| 2002/0085548 A1 * | 7/2002 | Ku et al. | 370/386 |
| 2002/0126670 A1 * | 9/2002 | Yamauchi et al. | 370/390 |
| 2002/0150041 A1 | 10/2002 | Reinshmidt et al. | |
| 2002/0176391 A1 * | 11/2002 | Hermann et al. | 370/338 |
| 2002/0196808 A1 | 12/2002 | Karri et al. | |
| 2003/0056006 A1 * | 3/2003 | Katsube et al. | 709/238 |
| 2003/0119508 A1 | 6/2003 | Gwon et al. | |
| 2003/0165137 A1 * | 9/2003 | Soloway et al. | 370/389 |
| 2003/0210787 A1 | 11/2003 | Billhartz et al. | |
| 2004/0024877 A1 | 2/2004 | Celle | |
| 2004/0024901 A1 | 2/2004 | Agrawal et al. | |
| 2004/0042402 A1 * | 3/2004 | Galand et al. | 370/237 |
| 2004/0066757 A1 | 4/2004 | Molteni et al. | |
| 2004/0132451 A1 * | 7/2004 | Butehorn et al. | 455/445 |
| 2005/0105524 A1 * | 5/2005 | Stevens et al. | 370/389 |
| 2006/0187893 A1 * | 8/2006 | Joshi | 370/338 |
| 2007/0271396 A1 | 11/2007 | Chen et al. | |
| 2007/0286097 A1 | 12/2007 | Davies | |
| 2008/0037542 A1 * | 2/2008 | Le et al. | 370/392 |
| 2008/0039079 A1 | 2/2008 | Iyer et al. | |

OTHER PUBLICATIONS

Corson, et al., RFC 2501, Internet Engineering Task Force RFC Repository, Jan. 1999, pp. 1-12., Jan. 1, 1999.

Deering, "Host Extensions for IP Multicasting", Host Extensions for IP Multicasting, Aug. 1989, http://www.internic.net/rfc/rFc1112.txt, pp. 1-16.

Derring, et al., RFC-2460, Internet Engineering Task Force RFC Repository, Dec. 1998, pp. 1-39., Dec. 1, 1998.

Droms, "Dynamic Host Configuration Protocol—RFC 2131," Bucknell University, Network Working Group, Internet Engineering Task Force (IETF), 22 pages, Mar. 1997.

Hong, et al., "Scalable routing protocols for mobile ad hoc networks", Hong, X., Xu K., Gerla, M., "Scalable routing protocols for mobile ad hoc networks", IEEE Network, vol. 16, Jul/Aug 2002, pp. 11-21., Jul. 1, 2002.

Johnson, David, "Mobility Support in IPv6," Apr. 27, 2000, pp. 1-77., 4/27/00.

Karagiannis, G., "Mobile IP-State of the Art Report" Ericsson, pp. 1-63 (1999)., Jan. 1, 1999.

Montenegro, RFC 2344, Internet Engineering Task Force RFC Repository, May 1998, pp. 1-19., May 1, 1998.

Moy, "OSPF Version 2", RFC 2328, Apr. 1998. www.itef.org., Apr. 1, 1998.

Narten, et al., "Neighbor Discovery for IP Version 6 (IPv6), RFC 2461," Network Working Group, The Internet Society, 87 pages, Dec. 1998.

Perkins, C., ed.; "IP Mobility Support", RFC 2002, Oct. 1996, pp. 1-5., Oct. 1, 1996.

Perkins, "IP Mobility Support for IPv4," Internet Draft, IETF, Jul. 13, 2000, pp. 1-99., Jul. 13, 2000.

Perkins, "RFC 2002", Internet Engineering Task Force RFC Repository, Oct. 1996, pp. 1-79., Oct. 1, 1996.

Perkins, et al., "Route Optimization in Mobile IP", Internet Draft, IETF, Feb. 2000, pp. 1-103., Feb. 1, 2000.

Sportack, "IP Routing Fundamentals", Cisco Press, Feb. 19, 1999., Feb. 19, 1999.

Tanenbaum, "Computer Networks, Third Edition, Chapter 5: The Network Layer," pp. 367-369, Copyright 1996.

Thomson, et al., "RFC 2462", Internet Engineering Task Force RFC Repository, Dec. 1998, pp. 1-25., Dec. 1, 1998.

Zhou, et al., "Reverse Routing: An Alternative to MIP and ROMIP Protocols", IEEE, pp. 150-155, May 9-12, 1999., May 9-12, 1999.

* cited by examiner

VARIABLE TRANSLUCENCY NO-SIGHT ROUTING FOR AD-HOC NETWORKS

RELATED APPLICATIONS

The present application claims priority from U.S. Provisional Patent Application No. 60/555,970, entitled "NO-SIGHT ROUTING FOR AD-HOC NETWORKS", filed on Mar. 25, 2004. In addition, the present application is related to U.S. patent application Ser. No. 11/087,430, entitled "NO-SIGHT ROUTING FOR AD-HOC NETWORKS", filed on Mar. 23, 2005. The present application is a continuation of U.S. patent application Ser. No. 11/087,408, filed on Mar. 23, 2005. The contents of all of these applications are hereby incorporated by reference in their entirety.

BACKGROUND INFORMATION

In recent years, the use of wireless communication networks as a system for facilitating communication between various types of mobile devices, such as portable computers, personal digital assistants ("PDAs"), cellular telephones and the like, has gained widespread acceptance. In particular, there has been a growing trend at developing infrastructureless network technologies to facilitate direct communication between two or more wireless devices. When two or more devices directly communicate without any infrastructure, they form a type of local area network ("LAN") known as an ad-hoc network. Due to the mobility of the devices involved, the topology of ad-hoc networks is typically subject to rapid changes, such as when devices are added, removed or moved from one location to another within the network.

Wireless devices may form or become part of an ad-hoc network when they are located within the range of at least one other wireless device. Each device (or "node") in the ad-hoc network may serve as a client, host, or router. Currently, a number of wireless technologies exist for supporting ad-hoc networks, including ones using standard protocols such as Bluetooth, Infrared Data Association ("IrDA"), and IEEE 802.11x. Ad-hoc networks are not limited to wireless devices and some or all of the devices in an ad-hoc network may use temporary wired connections that allow these devices to temporarily be part of the network, such as for the duration of a communications session.

Ad-hoc networks face a number of challenges. These challenges can be roughly divided into two main categories: physical layer issues (such as physical connectivity problems due to weak signal strength, etc.) and network layer issues (including network management and routing difficulties). Although physical layer connectivity is, of course, a prerequisite for network connectivity, recent improvements in physical connectivity have not been matched by improvements in network management and routing techniques.

For example, according to one conventional routing approach, every node in a network receives, through a process known as "flooding", enough information to build a complete map of the network. During flooding, each switching node (i.e., nodes that are configured to forward data packets) forwards a link-state packet ("LSP") to all nodes to which it is directly connected. Typically, link-state packets contain data detailing the ID of the node that created the LSP and a list of directly connected neighbors of that node.

Each switching node that receives this LSP then forwards the packet to its directly connected neighbors, which then forwards the same packet to its directly connected neighbors, and so on until the LSP has been forwarded to each node within the network. Once a given node has received an LSP from every other node in the network, it is able to compute a complete map of the topology of the network. Each node in the network is thus able to determine, based on the computed map, the least-cost path to any destination node in the network. Changes in network topology are accounted for by requiring each switching node to transmit a link-state update ("LSU") upon any perceived change in network topology (i.e., a neighbor of the switching node is disconnected or added). Typically, link-state updates contain data detailing the ID of the node that created the LSU and a list of directly connected neighbors of that node.

Although relatively simple in its implementation, this conventional routing approach (commonly known as "link-state" routing) suffers from a number of limitations, particularly when adapted for use in wireless ad-hoc networks. For example, in link-state routing, every node must have and store sufficient information to compute the location of every other node in the network. More particularly, because ad-hoc networks typically have flat address space (i.e., the addresses of each node do not identify a hierarchical relationship due to lack of central administration and constant motion), the routing table for each node in such networks must contain information about each and every other node. As the number of nodes connected to the network increases, the corresponding number of link-state packets and updates that must be transmitted, received and stored by each node also increases. When the amount of link-state traffic exceeds the physical capabilities of the hardware of the network, the network may become unreliable or fail. Thus, unacceptable increases in the amount of link-state data and traffic serve to limit the network's scalability potential by inhibiting the number of nodes that may feasibly connect to the network.

In addition, because switching nodes in a link-state routing scheme are required to transmit LSUs upon every perceived change in network topology, an inordinate number of LSUs may be propagated within the network due to the relatively high frequency with which topology changes occur in ad-hoc networks. This results in large amounts of routing traffic overhead being transmitted within the network, which may further limit the workable size of the ad-hoc network and lead to degradation of network performance and reliability. Given that wireless communications within a network may often be at lower bandwidths than wired communications, reducing overhead to maximize the total available bandwidth for substantive communications is highly desirable.

According to another approach, instead of allowing every link-state update generated by each switching node to fully flood the entire network, global LSUs (i.e., LSUs that are allowed to propagate throughout the entire network) are transmitted only on a periodic basis. Global LSUs typically represent LSUs having a time-to-live value ("TTL") set to infinity.

In conventional routing schemes, the TTL value of a data packet is a value contained in a packet header that indicates through how many nodes the packet should be allowed to traverse before being discarded or returned. Nodes in receipt of packets having a TTL value typically decrement the TTL value of the packet by 1 prior to flooding this packet to its neighbors. When the TTL value of the packet reaches 0, the packet is deleted. TTL values thus generally ensure that out-of-date link-state information is eventually removed from a network. Accordingly, by setting the TTL value of a global LSU to infinity, global LSUs are allowed to propagate throughout the entire network According to this alternative approach to traditional link-state routing schemes, also known as "hazy-sighted" routing, each switching node is required to transmit a global LSU during initial configuration of the network, thereby providing each node within the network with sufficient information to compute a complete map of the entire network. Thereafter, global LSUs are only transmitted upon the expiration of a period of time specified by a periodic timer. Between global LSU transmissions, non-global LSUs are transmitted. Typically, the TTL value of each non-global LSU is set to a value smaller than that of the size of the network so that they do not propagate throughout the entire network. Upon expiration of the period of time specified by the periodic timer, each switching node again transmits a global LSU.

Because global LSUs are only transmitted within this hazy-sighted routing scheme on a periodic basis, during certain periods of time various nodes within a network implementing this routing protocol may lack up-to-date information regarding the exact location of every other node in the network. Thus, although nodes may have received sufficient information to compute an up-to-date map of their surrounding region (as determined by the TTL value of the most recent non-global LSU), their understanding of the location of or best path to distant nodes (i.e., nodes outside of their horizon line) may be based on out-of-date information (as determined by the most recent global LSU).

Hazy-sighted routing thus allows information about distant nodes to be inexact, such that a switching node always knows how to get a packet closer to a destination node, but may not always know the details of the best path to this destination node. Once a transmitted packet has been forwarded to a node that is closer to the destination node, more information about this path is provided, and so on at the next closest node until the packet eventually arrives at the destination node. Inasmuch as the number of topological changes that might occur within the time specified by the periodic timer is likely to be greater than one, this periodic timing limitation serves to reduce the number of LSUs generated, thereby limiting the amount of traffic overhead promulgated within the network. Hazy-sighted routing thus sacrifices routing accuracy in favor of reduced link-state overhead.

As with the traditional link-state approach to routing described above, the so-called "hazy-sighted" routing approach suffers from similar scalability, performance and reliability concerns. For example, it is still necessary for the routing table to contain information about each and every node. Global LSUs are essential to providing such information. Thus, as discussed above, the use of global LSUs limits scalability, network performance and reliability.

In addition, although the amount of routing accuracy sacrificed by hazy-sighted routing schemes to achieve the desired reduction in link-state traffic overhead is an acceptable trade-off for networks composed of low-capacity links (such as ad-hoc networks formed exclusively of wireless connections), this tradeoff is problematic in networks composed at least in part of high-capacity links. For example, in a network composed of numerous high-capacity links, the amount of bandwidth that is saved by reducing the TTL of an LSU is relatively minor in comparison with the total bandwidth of each high-capacity link in the network. Thus, when hazy-sighted routing schemes are adapted for use in connection with networks composed at least in part of high-capacity links, the relatively minor traffic overhead efficiencies that are achieved are generally outweighed by the resulting losses in routing accuracy.

Accordingly, there exists a need for a system and method capable of enabling nodes within an ad-hoc network to seamlessly communicate with adjacent nodes, distant nodes and a wider network (such as the Internet) so long as physical connectivity is maintained with at least one other node. There also exists a need for a system and method capable of scaling beyond the size limitations of traditional ad-hoc networks, while minimizing any potential decreases in network performance and reliability. In addition, there exists a need for a system and method capable of adjusting the TTL of a packet based on the capacity of the links over which this packet will travel. Preferably, such a system and method would provide significant improvements in scalability, application performance and overall network connectivity.

DETAILED DESCRIPTION OF PREFERRED EMBODIMENTS

I. System Overview a. No Sight Routing

Figure 1:
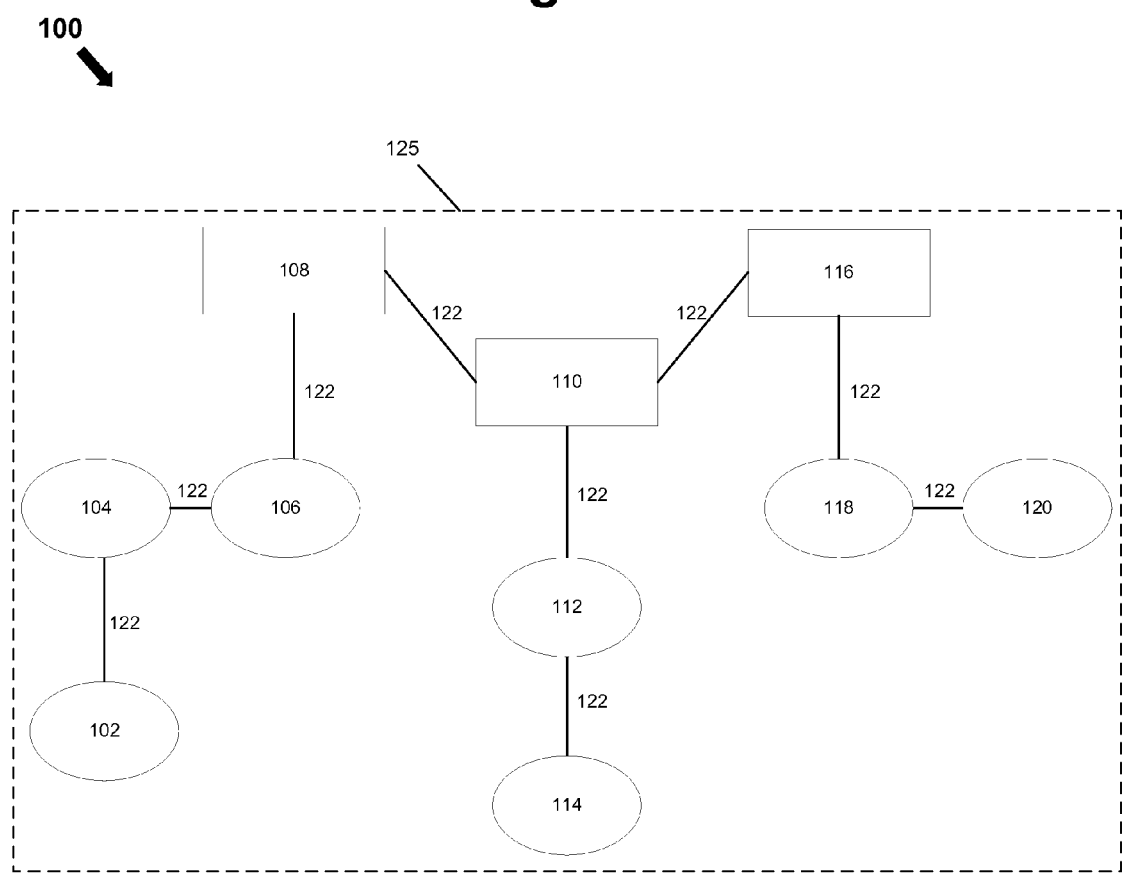
FIG. 1 illustrates an exemplary physical topology of a network capable of implementing a routing protocol.
Figure 2:
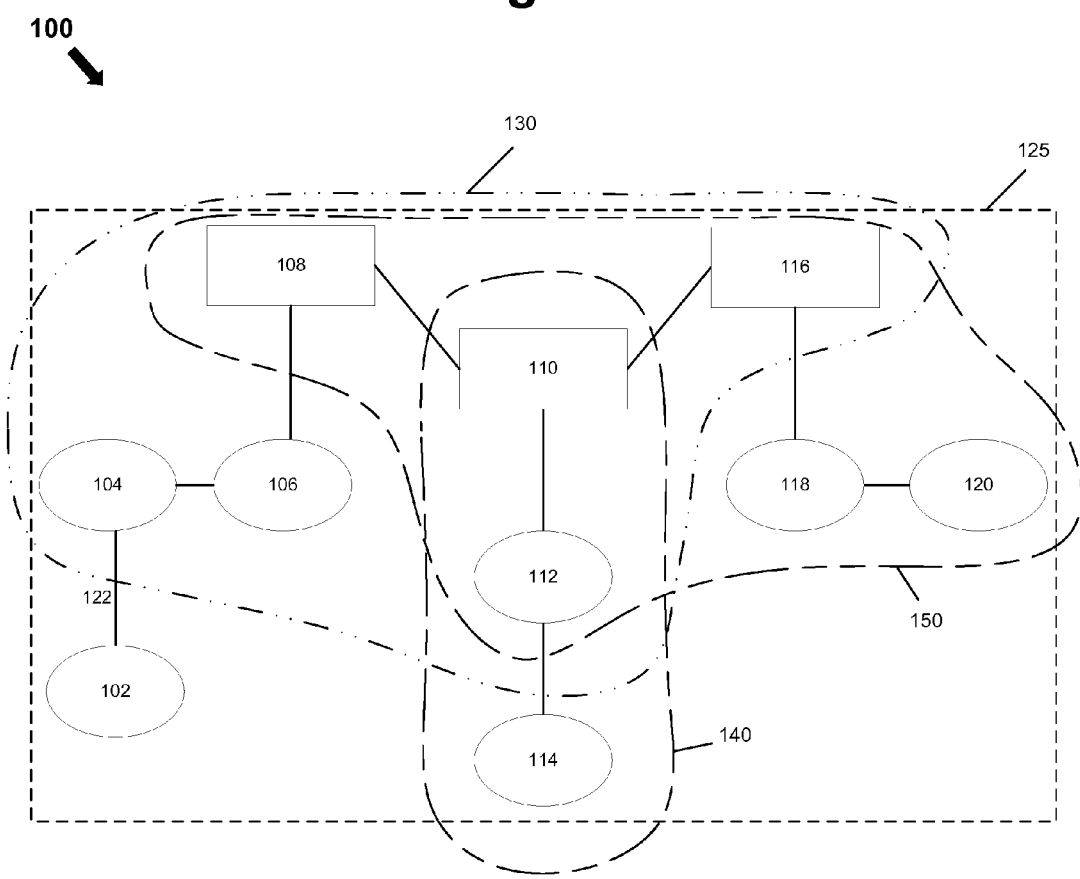
FIG. 2 illustrates an exemplary physical topology of a network capable of implementing a no-sight routing protocol.

FIG. 1 is a block diagram illustrating an exemplary physical infrastructure of a system 100 for implementing a no-sight routing protocol. FIG. 2 illustrates an exemplary physical topology of a sub-network 125 implementing an exemplary no-sight routing protocol with predetermined propagation limits.

Exemplary system 100 generally comprises, among other things, nodes 102, 104, 106, 108, 110, 112, 114, 116, 118 and 120. Nodes 102-120 are connected to one another via connections 122, which may include any number of connections recognized in the art, including, for example, wires, wireless communication links, fiber optic cables, etc. Nodes 102-120 connected together via connections 122 collectively form sub-network 125.

In general, nodes 102-120 represent connection terminals within exemplary sub-network 125. In some embodiments, a protocol operating on a network above that of sub-network 125 distinguishes between nodes 102-120 based on their packet-forwarding capabilities. For example, in some embodiments a protocol operating on a network above that of sub-network 125 recognizes oval-shaped nodes 102, 104, 106, 112, 114, 118 and 120 as representing "hosts" (i.e., nodes which only forward originating packets, as will be known to those of skill in the art) and rectangular-shaped nodes 108, 110, and 116 as representing "routers" (i.e., nodes which forward/route non-originating packets). This host/router distinction is not, however, made within sub-network 125. Within sub-network 125, all nodes are viewed as being directly connected; i.e., any node can send data to any other node.

According to certain embodiments, one or more of nodes 102-120 collectively forming exemplary sub-network 125 may be a mobile node. Generally speaking, a mobile node is a device whose location and point of attachment to exemplary sub-network 125 may frequently change. Examples of mobile nodes include cellular telephones, handheld devices, PDAs, and portable computers.

In many embodiments, the travel of a packet from any source node in sub-network 125 is limited by at least one predetermined limiting value. The factors that contribute to the potential limiting value include, for example, the physical distance the data packet has traveled from the source node, the aggregate bandwidth capacity of the links over which the data packet has traveled, the number of nodes through which the data packet has passed, and the amount of time that has passed since the data packet was transmitted from the source node.

For purposes of simplicity, the term "propagation limit" will be used hereinafter to collectively refer to application of one or more of the above-described predetermined limiting values. Further, the time, distance, etc. that a data packet travels or propagates within a network will be referred to as a "propagation parameter". In addition, generally speaking, the phrase "no-sight routing" will be hereinafter used to refer to systems and methods in which the propagation parameter of a data packet is limited by a propagation limit.

According to some embodiments, a propagation limit is a hop limit. Generally, "hop" refers to the trip a data packet takes from one node to the next, while "hop limit" refers to the maximum number of hops that a packet may propagate. A propagation limit may also be, for example, a time-to-live value or a variable translucency time-to-live value. A detailed explanation and discussion of variable translucency time-to-live values will be presented in a later section of the instant application.

FIG. 2 illustrates the concept of propagation limit, with horizon lines 130, 140 and 150 representing exemplary propagation limit boundaries for nodes 108, 114 and 116, respectively. In this example, an arbitrary hop limit of 2 is chosen as the propagation limit for nodes 108, 114 and 116 within sub-network 125. Accordingly, exemplary horizon line 130 illustrates that packets originating from node 108 may only travel two hops, encompassing nodes 104, 106, 110, 112 and 116. Similarly, exemplary horizon line 140 illustrates that packets originating from node 114 may only travel to nodes 110 and 112, while exemplary horizon line 150 illustrates that packets originating from node 116 may only travel to nodes 108, 110, 112, 118 and 120.

Although the propagation limit discussed in connection with FIGS. 1 and 2 is illustrated as being equal to 2, it is to be understood that the propagation limit may be set to any value or number, or be based on any algorithm, heuristic, etc. According to some embodiments, the propagation limits of all data packets transmitted within sub-network 125 are established irrespective of the type of data packet being transmitted. Alternatively, propagation limits for data packets propagated within sub-network 125 may be established at least in part on the type of data packet being propagated. For example, the value of a specific propagation limit may be set or adjusted based at least in part on whether the data packet in question is an LSP, an LSU, a multicast member LSU (used in multicasting, as will be well known to those of skill in the art), unicast data packet, or a multicast/broadcast data packet.

In many embodiments, the propagation limits of all data packets transmitted within sub-network 125 are set to equal values. For example, the propagation limits of all LSPs, LSUs (including multicast member LSUs), unicast data packets, and multicast/broadcast data packets propagated within a network might be set to an arbitrary hop limit of 5. Alternatively, only a portion or none of the data packets propagated within sub-network 125 may be configured to have equal propagation limits.

However, it should be noted that various efficiencies are lost when the propagation limits of all data packets are not set to equal values. For example, if the propagation limit of an LSU originating from a source node is set to a hop limit of 5, while the propagation limit of a unicast data packet from this same source node is set to a hop limit of 10, then this source node will be able to send packets to nodes up to 10 hops away, but will only be able to see routes for nodes within 5 hops. Conversely, if the propagation limit of an LSU originating from a source node is set to a hop limit of 10, while the propagation limit of a unicast data packet from this same source node is set to a hop limit of 5, then this source node will be able to see routes for nodes up to 10 hops away, but will only be able to send packets to nodes within 5 hops.

Thus, although in many embodiments the propagation limits of all data packet types are set to equal values, in some embodiments the propagation limit of a unicast data packet originating from a source node is preferably at least as large as that of an LSU originating from the same source node to ensure that all routes "seen" by the source node can be reached. In addition, to ensure communication between a source node and a destination node, the propagation limits for both the source node and the destination node are preferably equal to or greater than the propagation parameter between these nodes.

With respect to multicast/broadcast data packets, in certain embodiments it may be desirable to allow the propagation limits of a multicast member LSU to differ from the propagation limit of a multicast data packet. For example, the propagation limit of a multicast data packet from a source node may be set to a higher value than the propagation limit of a multicast member LSU for this source node. Setting the propagation limits in this manner enables the source node to send discovery or advertisement messages to a group of nodes, since explicit routes are not generally needed for such discovery messages. Nodes receiving such discovery messages will not, however, be able to reply to the source node.

In some embodiments, the propagation limits of data packets within sub-network 125 are dynamically adjusted based on a variety of factors, such as node density, network traffic volumes, and other network characteristics. Propagation limits for each node within exemplary sub-network 125 may also be coordinated so as to gradually vary across the network topology, based on a pre-determined heuristic. For example, in certain embodiments the propagation limit of each source node in an exemplary sub-network 125 might be required to differ from the propagation limit of each destination node by no more than PP/x, where PP is equal to the propagation parameter between these nodes (e.g., the number of hops between these nodes, the physical distance between these nodes, the time required to travel between these nodes, etc) and x is equal to a predetermined propagation limit variation value.

For example, in a network where the propagation limits of nodes are set to vary by no more than PP/5 (5 being chosen as an exemplary value for propagation limit variation value x), a destination node 5 hops away from a source node in this network would be required to have a propagation limit that differs by no more than 1 (PP/5=5/5=1) from the source node. Defining the relationships between the propagation limits of each node in a network in this exemplary manner thus ensures that propagation limits throughout the network's topology will vary by no more than a predetermined amount. Generally speaking, while the propagation limit variation value x may be any number or value desired, higher propagation limit variation values x result in smaller amounts of propagation limit variation throughout a network's topology.

Although the propagation limit for each node in exemplary sub-network 125 may be set to any value or number, or set or dynamically adjusted based on any algorithm, heuristic, etc., it should be recognized that lower propagation limits generally improve the scalability of the sub-network (due to reduced sub-network layer overhead), while higher propagation limits result in expanded horizon lines for each node within the sub-network. In certain embodiments, the optimum value for maximizing these competing concerns has been found to fall within a hop limit range of 5-10.

According to the exemplary no-sight routing system described above, because the travel of data within exemplary sub-network 125 is limited by a predetermined propagation limit, nodes need not transmit nor store information about distant nodes falling outside of their respective horizon lines. The network overhead price paid by conventional routing protocols (where every node is required to know the location of all other nodes in the network, and where sub-network-layer routing traffic is required to convey that information) is thus advantageously avoided. In particular, because the use of global LSUs (and the sub-network-layer routing traffic associated with these global LSUs) is eliminated in no-sight routing, ad-hoc networks of arbitrarily large physical extent may be created without suffering from the various scalability, reliability and performance limitations discussed in connection with conventional link-state routing schemes.

Moreover, because no-sight routing enables the formation of ad-hoc networks of arbitrary physical extent, nodes no longer need to be assigned to particular ad-hoc sub-networks in order to partition the overall network into manageable and workable portions (such as when a conventional network of 10,000 nodes is partitioned into 100 different sub-networks of 100 nodes). This results in a reduction of the configuration operations required and leads to increased ease-of-use and node interoperability, such that all nodes may seamlessly interoperate with one another so long as they are within their respective horizon lines. No-sight routing thus obtains the reachability benefits of an ad-hoc network while addressing traditional scaling and configuration limitations.

b. Variable Translucency TTLs

Figure 3:
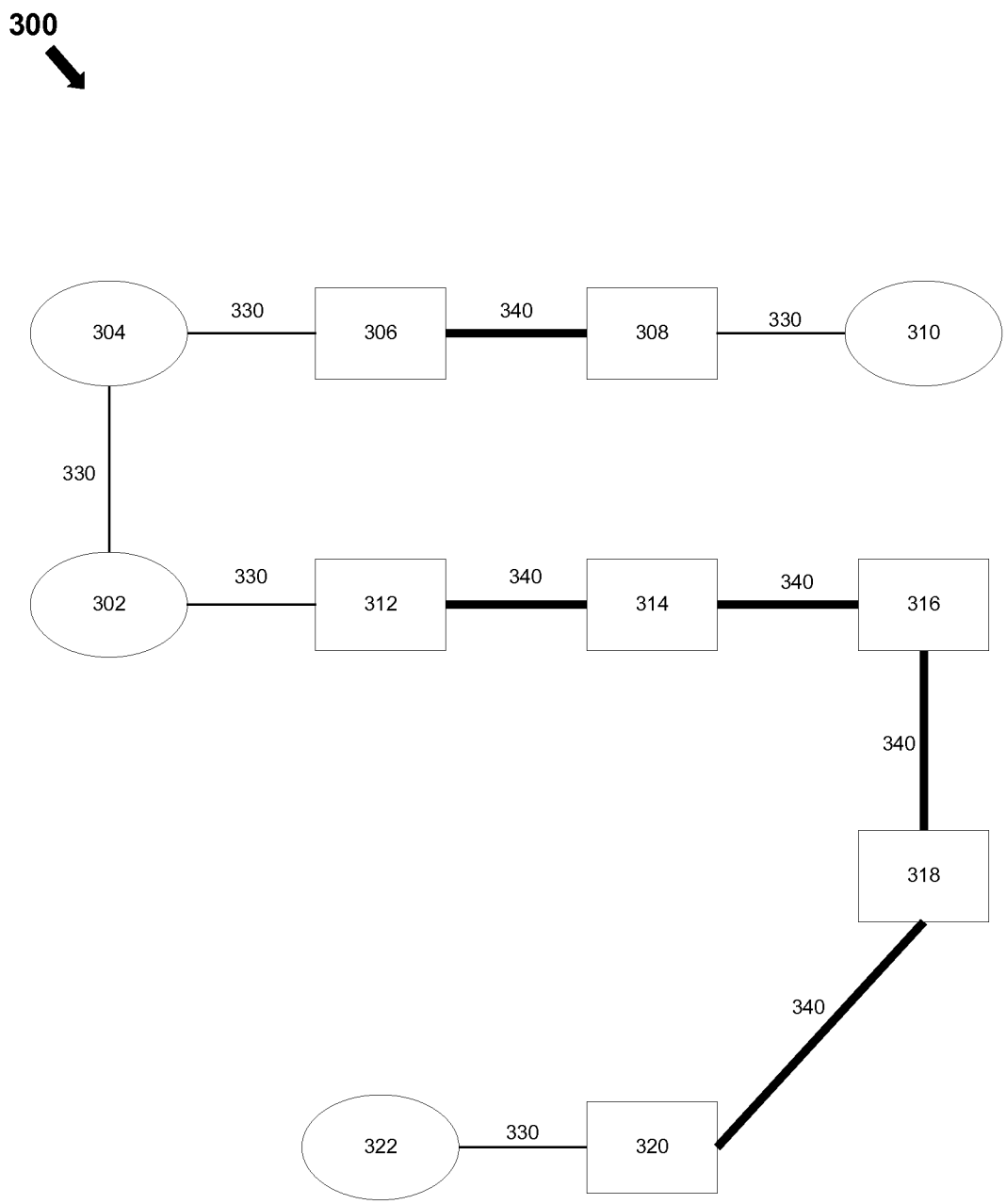
FIG. 3 illustrates an exemplary physical topology of a network in which the travel of data may be limited based on variable translucency time-to-live values.

FIG. 3 illustrates an exemplary physical topology of a network 300 in which the travel of data may be limited based on variable translucency time-to-live values. Exemplary network 300 generally comprises, among other things, nodes 302, 304, 306, 308, 310, 312, 314, 316, 318, 320 and 322. In general, nodes 302-322 represent connection terminals within network 300. In many embodiments, oval-shaped nodes 302, 304, 310 and 322 represent hosts while rectangular-shaped nodes 306, 308, 312, 314, 316, 318 and 320 represent routers. In addition, according to certain embodiments one or more of nodes 302-322 may be a mobile node capable of changing its topological location within network 300.

Nodes 302-322 are connected to one another via low-capacity communication links 330 and high-capacity communication links 340. Although low-capacity communication links 330 may include any number of connections recognized in the art, in certain embodiments low-capacity communication links 330 represent communication links that are generally recognized as only being capable of handling marginal to moderate amounts of network traffic. In many embodiments, low-capacity communication links 330 represent wireless communication links.

In contrast, although high-capacity communication links 340 may include any number of connections recognized in the art, in certain embodiments high-capacity communication links 340 represent links that are generally recognized as being capable of handling large amounts of network traffic. Examples of high-capacity communication links 340 include dedicated copper wire connections, dedicated fiber optic cable connections, etc.

As detailed above in connection with the explanation of no-sight routing, in many embodiments of system 100 the travel of a packet from any source node in sub-network 125 is limited by a propagation limit equal to, for example, a hop limit or a time-to-live value. This propagation limit may also be equal to a variable translucency time-to-live value.

Generally speaking, variable translucency time-to-live values refer to values stored in the packet header of a data packet indicating the distance that the data packet will be allowed to travel before being discarded or returned. Instead of merely being decremented by 1 each time the data packet traverses a node, as is conventional in the art, variable translucency TTL values are decremented by a transmission cost associated with a communication link.

Transmission costs generally refer to the cost of transmitting data (such as a link-state update packet) over a communication link, relative to the bandwidth capacity of the link. In many embodiments, the transmission cost associated with a communication link is directly reflective of the link's bandwidth capacity. For example, low-capacity communication links 330 such as wireless networks are generally assigned higher transmission cost values than high-capacity communication links 340 like dedicated fiber-optic links. Variable translucency time-to-live values thus provide a method for varying the distance that a data packet propagated within network 300 may travel based on the bandwidth capacity of the links over which this packet travels.

Returning to FIG. 3, in certain embodiments the length that data packets transmitted by node 302 in exemplary network 300 may travel depends on the bandwidth capacity of the communication links that are to be traversed by the packet. For example, if a transmission cost of 256 is assigned to each low-capacity communication link 330, and a transmission cost of 1 is assigned to each high-capacity communication link 340, then a data packet broadcast from node 302 and having a variable translucency TTL value of 768 will reach node 322, but will not reach node 310. This is because the aggregate transmission costs associated with the communication links forming the route from node 302 to node 310 equal 769 (256+256+1+256), which exceeds the variable translucency TTL value, while the aggregate transmission costs associated with the communication links forming the route from node 302 to node 322 equal 516 (256+1+1+1+1+256).

In contrast, if a data packet having a conventional TTL value of 4 were to be transmitted by node 302, then this packet would reach node 310, but would not reach node 322. This is because, as explained earlier, in conventional routing schemes the TTL value of a data packet is decremented by the number 1 by a node prior to flooding this packet to its neighbors. Thus, in the example of a data packet transmitted from node 302 and having a conventional TTL value of 4, this packet would reach node 310 since this node is within 4 hops of node 302. Conversely, this packet would not reach node 322 since this node is more than 4 hops away from node 302.

In many embodiments, a source node desiring to transmit a data packet to a destination node determines the transmission cost associated with the communication link between these two nodes prior to transmitting the packet. If the transmission cost associated with the desired communication link exceeds the remaining variable translucency TTL value of the packet, the source node refrains from transmitting the packet over this communication link. Determining the transmission costs associated with a particular communication link prior to transmitting data over the same in this manner thus ensures that data packets are only transmitted over communication links having transmission costs that are lower than their variable translucency TTL value.

Accordingly, by decrementing the variable translucency TTL value of a data packet by the transmission cost associated with the communication link over which the packet is to be transmitted, a routing protocol may be adapted for more efficient use in connection with networks composed at least in part of high-capacity links. Variable translucency TTLs thus enable improved routing accuracy and expanded horizon lines in networks capable of tolerating the increased link-state overhead associated with this increased accuracy, without significantly increasing the link-state overhead in networks incapable of tolerating such increases in such overhead. The unacceptable trade-off discussed above in connection with routing protocols employing conventional TTLs (where relatively minor reductions in link-state traffic overhead are achieved in consideration for reduced routing accuracy) is thus overcome, resulting in increased network efficiency and operability.

Although the above description of variable translucency TTLs has been provided in connection with a no-sight routing scheme, persons of skill in the art will recognize that variable translucency TTLs are generally applicable to any number of routing schemes employing data packets in which the distance information may propagate is limited. For example, in addition to no-sight routing schemes, variable translucency TTLs might also be adapted for use in connection with hazy-sighted routing schemes or traditional link-state routing schemes in which the life of a packet is limited by a TTL.

II. Exemplary Process Flows a. No-Sight Routing

Figure 4:
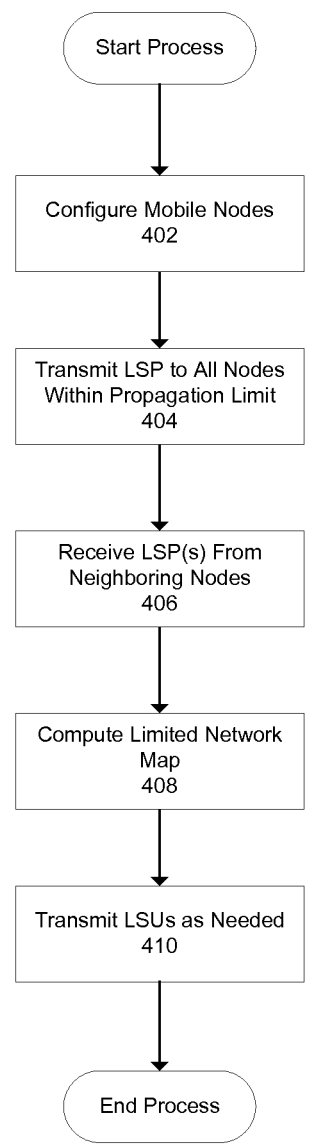
FIG. 4 depicts an exemplary process flow for performing no-sight routing.

FIG. 4 depicts an exemplary process flow 400 for performing no-sight routing. Process flow 400 is meant to serve merely as an example for how no-sight routing may be implemented, such that the various steps recited therein should not be deemed to limit the scope of its application. In addition, various other intermediary steps not explicitly illustrated in FIG. 4 may be performed as needed, regardless of their exclusion from FIG. 4.

At step 402, the various parameters of each mobile node are configured. In many embodiments, these parameters are configured by system administrators of the network and/or device manufacturers of the mobile nodes. According to certain embodiments, a propagation limit and/or an algorithm or heuristic for computing a propagation limit, as discussed above, is stored in the mobile node during step 402. As described in greater detail above, a mobile node may be assigned one or more propagation limits during this step for use in connection with all types of data to be transmitted by the mobile node. A mobile node may also be assigned a different propagation limit for each data packet type to be transmitted by this mobile node. In addition, although all mobile nodes within a network may be configured to have the same propagation limit, the propagation limits of each mobile node may be modified as needed.

Step 402 may occur in an automated fashion, such as by a computer, so that manual configuration is unnecessary. In addition, step 402 may be omitted from exemplary process flow 400 as needed, such as when propagation limits are to be dynamically assigned or adjusted based on network properties such as node density, as discussed in greater detail above.

Upon completion of step 402, control proceeds to step 404 where a mobile node transmits an LSP to all neighboring nodes. As described above, link-state packets typically contain data detailing the ID of the node that created the LSP and a list of directly connected neighbors of that node. In many embodiments, the travel of this LSP throughout the network is determined, as explained in greater detail above, by a propagation limit.

At step 406, LSPs from neighboring nodes are received. Again, due to the propagation limits placed on these LSPs, not all nodes connected to the network will receive all other nodes' LSPs. Upon receipt of these LSPs from neighboring nodes, at step 408 each node computes a limited network map based on the information received from each LSP received. As various topology changes to the network are perceived by a mobile node (i.e., a neighboring mobile node is added or removed), the mobile node generates and transmits to its neighboring devices LSUs detailing the changes that have been observed.

b. Variable Translucency TTLs

Figure 5:
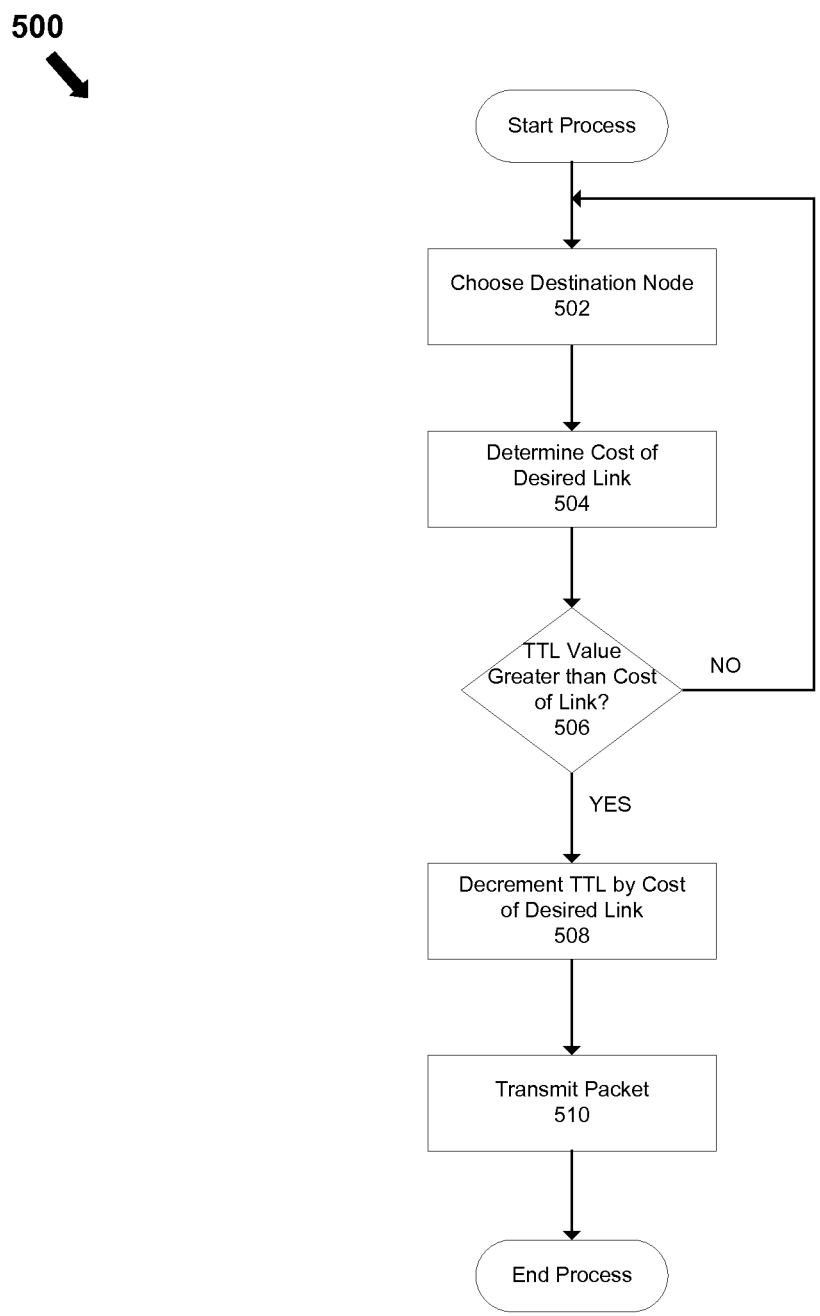
FIG. 5 depicts an exemplary process flow for limiting the travel of data via variable translucency time-to-live values.

FIG. 5 depicts an exemplary process flow 500 for propagating data based on variable translucency time-to-live values. Process flow 500 is meant to serve merely as an example for how variable translucency TTLs may be utilized, such that the various steps recited therein should not be deemed to limit the scope of its application. In addition, various other intermediary steps not explicitly illustrated in FIG. 5 may be performed as needed, regardless of their exclusion from FIG. 5.

At step 502, a source node in exemplary network 300 determines to which of its neighboring nodes, if any, a data packet is to be transmitted. In many embodiments, the source node makes this determination in accordance with procedures provided by a routing protocol, such as the no-sight routing protocol described above.

Once a destination node has been chosen, at step 504 the transmission cost of the communication link provided between the source node and this destination node is determined. In certain embodiments, transmission costs are assigned to communication links by a routing protocol. The transmission cost of a communication link may also be computed by a source node in accordance with, for example, a predetermined heuristic. For example, a source may compute the transmission cost of a communication link based on various parameters of the link, such as the physical length of the link, the bandwidth capacity of the link, the type of medium used to facilitate the link, etc.

Upon determining the transmission cost of the communication link connecting the source node to the destination node, at step 506 it is determined whether the variable translucency TTL value of the data packet to be transmitted is greater than the transmission cost of the communication link. If so, control proceeds to step 508. Otherwise, control returns to step 502 where another destination node, if available, is chosen.

At step 508, the variable translucency TTL value of the data packet to be transmitted is decremented by the determined/computed transmission cost of the communication link. At step 510, the source node transmits the data packet to the chosen destination node.

III. Alternative Embodiments

In accordance with the provisions of the patent statutes, the principles and modes of operation have been explained and illustrated. However, it should be understood that embodiments described herein may be practiced otherwise than is specifically explained and illustrated without departing from the spirit or scope thereof, and that the invention described herein is intended to be limited only by the following claims.

What is claimed is:

1. A method comprising:
   determining whether a propagation limit of a packet is greater than a predetermined transmission cost assigned to a first link from a first node of a network to a second node of the network, the propagation limit established based at least in part on a node density of the network, the transmission cost assigned to the first link according to an aggregate cost of transmitting data over a route to a destination using the first link;
   if the propagation limit is greater than the transmission cost associated with the first link, adjusting the propagation limit of the packet based at least in part on the transmission cost and transmitting the packet over the first link from the first node to the second node;
   associating a first bandwidth with the first link; and
   determining the transmission cost assigned to the first link based at least in part on the first bandwidth associated with the first link.

2. The method as set forth in claim 1, the transmission cost of the link varies inversely with the first bandwidth associated with the first link.

3. The method as set forth in claim 1, wherein the first link includes at least one of a wireless link, a copper link and a fiber optic link.

4. The method as set forth in claim 1, further comprising:
   determining whether the adjusted propagation limit of a packet is greater than a second predetermined transmission cost assigned to a second link, the second link carrying traffic from the second node to a third node of the network, the second transmission cost assigned to the second link according to a cost of transmitting data over the second link; and
   if the adjusted propagation limit is greater than the second transmission cost associated with the second link, further adjusting the propagation limit of the packet by the second transmission cost and transmitting the packet over the link from the second node to the third node, thereby providing the packet along a route including the first link and the second link.

5. The method as set forth in claim 4, further comprising:
   determining the respective transmission cost of the second link based at least in part on a second bandwidth associated with the second link.

6. The method as set forth in claim 5, wherein a summation of the respective transmission costs includes at least the respective transmission costs of the first link and the second link.

7. The method as set forth in claim 1, further comprising selecting a route over which to provide the packet, the selected route including the first link associated with the first bandwidth, a second link associated with a second bandwidth, and a third link associated with a third bandwidth, the first link, the second link, and the third link each including at least one of a wireless link, a copper link, and a fiber optic link.

8. The method as set forth in claim 7, further comprising:
   determining the respective transmission cost of the second link based at least in part on the second bandwidth;
   determining the respective transmission cost of the third link based at least in part on the third bandwidth; and
   wherein a summation of the respective transmission costs includes at least the respective transmission costs of the first link, the second link, and the third link.

9. The method as set forth in claim 1, further comprising:
   identifying a type of the packet to be transmitted by the first node; and
   establishing the propagation limit for the packet based at least in part on the identified type of the packet and the node density of the network.

10. The method as set forth in claim 1, further comprising setting a propagation limit for a multicast data packet transmitted from the first node to a higher value than a propagation limit of a multicast member link-state update packet transmitted from the first node.

11. The method as set forth in claim 1, further comprising adjusting the propagation limit of the packet based at least in part on a physical distance that the packet has traveled from an origination node.

12. The method as set forth in claim 1, further comprising adjusting the propagation limit of the packet based at least in part on a physical distance between the nodes.

13. A system comprising:
    a plurality of nodes of a network, each configured to receive and transmit packets, wherein a first node of the network is configured to:
        determine whether a propagation limit of a packet is greater than a predetermined transmission cost assigned to a link from the first node to a second node of the network, the propagation limit established based at least in part on a node density of the network, the transmission cost assigned to the link according to an aggregate cost of transmitting data over a route to a destination using the link; and
        if the propagation limit is greater than the transmission cost associated with the link, adjust the propagation limit of the packet based at least in part on the transmission cost and transmit the packet over the link from the first node to the second node;
    wherein the network is configured to
        associate a bandwidth with the link; and
        determine the transmission cost assigned to the link based at least in part on a bandwidth associated with the link.

14. The system as set forth in claim 13, wherein a second node is configured to associate a second bandwidth with a second link.

15. The system as set forth in claim 14, wherein the first node is configured to determine the transmission cost based at least in part on the first bandwidth and the second node is configured to determine the second transmission cost based at least in part on the second bandwidth.

16. The system as set forth in claim 14, wherein at least one of the link and the second link includes at least one of a wireless link and a physical link.

17. The system as set forth in claim 13, wherein a second node of the network is configured to:
    determine whether the adjusted propagation limit of the packet is greater than a second predetermined transmission cost assigned to a second link, the second link carrying traffic from the second node to a third node of the network, the second transmission cost assigned to the second link according to a bandwidth capacity-of the second link; and
    if the adjusted propagation limit is greater than the second transmission cost associated with the second link, further adjusting the adjusted propagation limit of the packet by the second transmission cost and transmit the packet over the link from the second node to the third node, thereby providing the packet along a route including the first link and the second link.

18. A method comprising:
    assigning a respective transmission cost to each of a plurality of links associated with a route connecting nodes of a network, the respective transmission cost assigned according to an aggregate cost of transmitting data over the route to a destination based on an aggregate bandwidth capacity of the respective links;

establishing, based at least in part on a node density of the network, a propagation limit in a header of a packet to be transmitted by a first node of the network;

determining, by the first node, whether the propagation limit included in the header of the packet is greater than a first predetermined transmission cost assigned to a first link of the plurality of links, the first link being from the first node to a second node of the network; and if the propagation limit is greater than the transmission cost associated with the first link, reducing the propagation limit of the header of the packet by the first predetermined transmission cost and transmitting the packet over the first link from the first node to the second node.

19. The method as set forth in claim 18, further comprising:

determining, by the second node, whether the reduced propagation limit of the packet is greater than a second predetermined transmission cost assigned to a second link, the second link carrying traffic from the second node to a third node of the network, the second transmission cost assigned to the second link according to a bandwidth capacity of the second link; and if the reduced propagation limit is greater than the second transmission cost associated with the second link, further reducing the reduced propagation limit of the packet by the second transmission cost and transmitting the packet over the link from the second node to the third node, thereby providing the packet along a route including the first link and the second link.

* * * * *